Patented Jan. 27, 1948

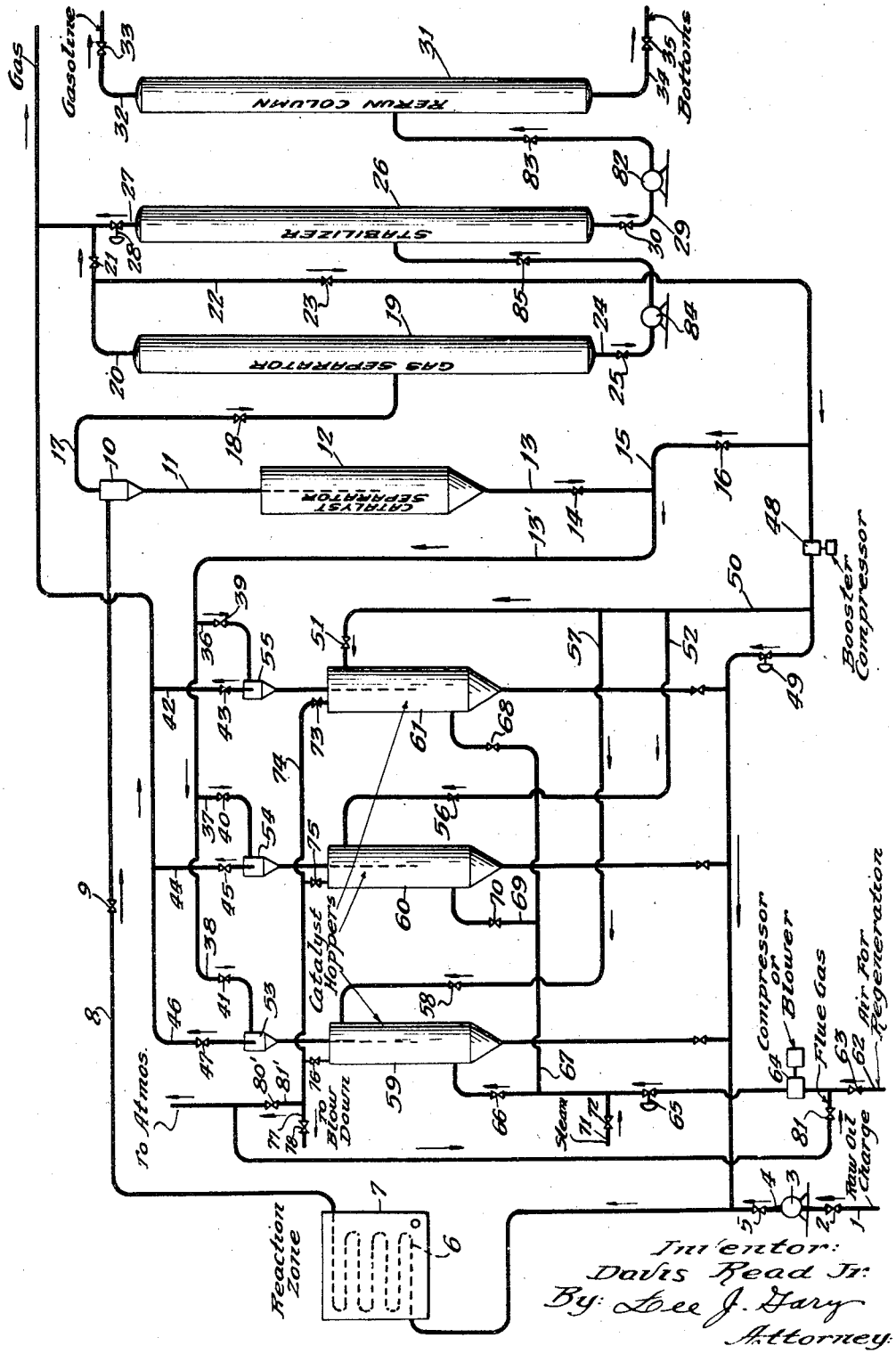

2,435,158

UNITED STATES PATENT OFFICE 2,435,158

HYDROCARBON CONVERSION PROCESS

Davis Read, Jr., Downers Grove, Ill., assignor to Universal Oil Products Company, Chicago, Ill., a corporation of Delaware Application April 30, 1945, Serial No. 591,035

11 Claims. (Cl. 196—52)

The present invention relates to the catalytic conversion of organic compounds and is more specifically concerned with the catalytic conversion of organic compounds in the presence of spherical catalyst particles.

In recent years catalytic processes have been employed extensively in organic reactions, particularly in the conversion of hydrocarbon oils to chemicals or motor fuels, for example, the cracking of high boiling oils to gasolines, dehydrogenation of saturated hydrocarbons to olefinic or aromatic hydrocarbons, conversion of butanes and butenes to butadiene, and ethylbenzene to styrene. Some of the earlier methods of employing solid catalysts consisted of passing the hydrocarbons or other organic compounds through a reaction zone in which the catalyst was deposed in fixed bed relationship to the incoming reactants, or conducting the reaction by suspending minor amounts of the catalyst in granular or powdered form in a stream of reactants which is thereafter passed through a heating zone maintained at the desired conditions to produce the desired reaction.

The present invention consists of an improvement in a method of conducting the latter type of operation. The basic disadvantages of the use of powdered or granular catalyst in suspension in the reactants are, first, erosion of the equipment through which the catalyst is passed, and secondly, the rapid rate of attrition of the catalyst particles to more finely divided materials.

It is an object of the present invention to provide an economical process employing a solid catalyst in suspension in the reactants with a minimum of erosion of the equipment and a low rate of attrition of the catalyst particles.

In one embodiment the present invention consists of a catalytic process for the conversion of organic compounds which comprise subjecting said organic compound at conversion conditions of temperature and pressure to the action of a spherical shaped catalyst suspended therein.

The use of spherical catalyst particles eliminates to a large extent the difficulty of erosion of the equipment. Powdered or granular catalyst when passed at a rapid rate through the equipment causes considerable erosion due primarily to the sharp jagged edges of the individual particles or granules producing an effect similar to that obtained when sand blasting metals. The spherical particles flow smoothly through the equipment without contacting the surfaces of the equipment with jagged edges thereby reducing erosion to a minimum.

As evidenced by data presented hereinafter in this specification, the rate of attrition of the spherical particles is substantially lower than that of powdered or granular materials. This decreased attrition not only permits the maintenance of a more uniform catalyst size throughout the reaction zone, but also has the attending advantage of decreasing catalyst losses which ordinarily accompany attrition by decreasing the formation of very fine powders which are lost by entrainment in the outgoing reactants.

The process of the present invention may be satisfactorily employed in various organic conversion processes and in particular in hydrocarbon conversion processes, such as the catalytic cracking of higher boiling oils to lower boiling oils, catalytic reforming of straight-run gasolines, catalytic dehydrogenation of paraffinic, monoolefinic or naphthenic hydrocarbons, and the catalytic treatment of olefinic gasolines to either isomerize the olefins contained therein or to lower the quantity of olefins present by hydrogen transfer or other similar reactions. The process is also applicable to operations in which alkyl groups are transferred from a polyalkylated aromatic or naphthenic hydrocarbon to a less alkylated compound, such as for example, the formation of monoethylbenzene from diethylbenzene and benzene.

The catalysts which may be employed in the present invention comprise synthetically prepared composites of silica-alumina, silica-magnesia, silica-thoria, silica-zirconia, silica-boron oxide, or a composite containing silica-alumina and one or more of the oxides of thorium, boron, zirconium, titanium, magnesium. Catalysts comprising oxides or sulfides of vanadium, molybdenum, chromium and tungsten, either alone or in admixture with one another, preferably supported on materials such as silica or alumina can also be employed.

These catalysts may be formed in spherical shapes by various methods. Methods which are particularly applicable consist of forming a sol or gel of the compounds and suspending it in a liquid or gaseous medium under controlled conditions to form a rigid sphere which can be subsequently purified, washed and impregnated by some of the other compounds. For example, a slurry of silica hydrogels may be spray dried to form smaller spherical particles and the purified spheres impregnated with aluminum or magnesium salts to form a composite catalyst.

The operating conditions employed, such as temperature and pressure, will of course be dependent upon the particular type of conversion reaction desired. In catalytic cracking operations the temperature will ordinarily range from about 750 to about 1100° F. at pressures in the range of about atmospheric to slightly superatmospheric of the order of 200 pounds per square inch gage, catalyst to hydrocarbon weight ratios of about 1:1 to 1:100. In catalytic reforming or dehydrogenation operations, the temperature and weight ratios of catalyst to hydrocarbon will be similar to those employed in the catalytic cracking operations. However, if the operation is the so-called hydroforming operation, i. e., catalytic reforming in the presence of hydrogen, the pressure range will be of the order of from about 100 to about 1000 pounds per square inch gage.

The operation of the present invention will be more clearly described in the following description of the attached drawing which illustrates a conventional side elevation of one type of apparatus in which the objects of the invention can be accomplished. This description clearly indicates the advantages of employing the spherical catalyst, particularly as to the simplicity of the catalyst recovery system employed in contrast to those necessary when employing powdered or granular catalyst materials.

In order to simplify explanation of the drawing, the description will be limited to the catalytic cracking operation and standard equipment, such as condensers, coolers, etc., have been eliminated from the drawing. However, it is not intended that this description limit the generally broad scope of this invention in any manner whatsoever.

It will be noted that the apparatus described provides a method of introducing the catalyst into the system without the use of a pump, thus simplifying the operation and eliminating the operating difficulties usually encountered when employing such pumps.

Referring to the drawing, the charging stock for example, a Pennsylvania gas oil, is introduced through line 1 containing valve 2 into pump 3 which discharges through line 4 containing valve 5 and is commingled with spherical catalyst particles obtained, as hereinafter set forth, within line 4 and the mixture introduced into reaction zone 6 which consists of a heating coil disposed within furnace 7 wherein the mixture is heated to conversion conditions. The reaction products leave coil 6 through line 8 containing valve 9 and are directed into cyclone separator 10 wherein the spherical cracking catalyst, for example a synthetic composite of silica-alumina, is separated from the hydrocarbons. The separated catalysts drops down through line 11 into catalyst separator 12. Reaction products are withdrawn from the cyclone separator through line 17 containing valve 18 and are directed into gas separator 19 wherein the light hydrocarbon gases formed during the reaction are separated from the liquid hydrocarbons. These gases which include butanes, propanes, ethane and small amounts of methane in addition to ethylene, propylene and butylenes, are withdrawn from gas separator 19 through line 20 and a portion discharged from the system through valve 21 and line 27 with the remaining portion being circulated through line 22 containing valve 23 and employed after passage through compressor 48 as a means for pressurizing catalyst hoppers 59, 60 and 61 as hereinafter described. The liquid products in gas separator 19 are withdrawn through line 24 and valve 25 into pump 84 which discharges through valve 85 into fractionator 26 wherein the liquid products are stabilized by the removal of a portion of light gases. The liquid products from fractionator 26 are withdrawn through line 29 containing valve 30 into the suction side of pump 82 which discharges through valve 83 into fractionator 31 wherein they are separated into a gasoline fraction and a bottoms fraction, the gasoline fraction being recovered overhead through line 32 containing valve 33. The bottoms fraction comprising high boiling residue and unconverted gas oil is withdrawn through line 34 containing valve 35 and may be recovered as a product of the reaction, or in some cases may be recycled back to the reaction zone.

The gaseous hydrocarbons removed overhead from fractionator 26 pass through line 27 containing valve 28 into line 46 where they are commingled with the gases from cyclone separators 53, 54 and 55 and may be passed to the fuel system or recovered as a product of the reaction.

The spheres collected in the bottom of catalyst separator 12 are transferred through line 13 and adjustable orifice valve 14 to one of the cyclone separators 53, 54 and 55 at the top of hoppers 59, 60 and 61, respectively. This is accomplished by discharging the spheres from line 13 into manifold 13' having branch lines 36, 37 and 38 provided with valves 39, 40 and 41, respectively, and which communicate with cyclone separators 55, 54 and 53, respectively. In manifold 13', the catalyst spheres are suspended in recycle gas supplied from line 22 through line 15 having valve 16. In the operation of the present process, one of the hoppers is employed to collect the catalyst while another, after being pressured with recycle gas to a pressure above the reaction zone pressure, feeds the regenerated catalyst through an adjustable orifice into the recycle gas stream and thence to the reaction zone, and the third hopper acts as a regenerator for the spent catalyst. The arrangement herein presented permits the use of any one of the hoppers as a feeder to the recycle gas stream, catalyst storage hopper or regenerator hopper and permits a truly continuous operation. To pressurize the hoppers, recycle gas from line 22 is compressed in compressor 48 and supplied to the hoppers from manifold line 50, the gas being introduced to hopper 59 through line 57 having valve 58, to hopper 60 through line 52 having valve 56 and to hopper 61 through valve 51 in line 50. A portion of the compressed gas is passed through valve 49 and, after receiving a supply of regenerated catalyst from one of the hoppers, is introduced to feed line 4 leading to reaction zone 6. The fresh catalyst charge or any makeup catalyst can be added to any one of the hoppers.

When employing any one of the three hoppers for regeneration of the catalyst, flue gas leaving the hoppers through either of valves 73, 75 or 76, depending upon which hopper is being employed for regeneration, passes through line 74 into line 81' from which it is directed through valves 80' and 81 into the suction side of compressor 64 which discharges through valve 65 into line 67 and is recirculated through the hopper in admixture with regulated amounts of air introduced through line 62 containing valve 63. In this manner the oxygen concentration can be maintained at a comparatively low value to prevent too rapid burning with the attending temperature rise which may damage the catalyst. The catalyst employed is somewhat thermophobic and temperatures in excess of about 1400° F. tend to cause a deterioration of the catalyst activity ordinarily by decreasing the surface area of the catalyst. Steam may be introduced for purging purposes through line 71 containing valve 72. Excess gases may be discharged from line 81' to the atmosphere as shown on the drawing to maintain a substantially constant pressure on the hopper during regeneration. The products from the purging operation which will consist of hydrocarbons retained on the catalyst may be withdrawn through line 77 containing valve 78 to any suitable separating equipment to separate the hydrocarbons from the steam condensate. The regenerating gases can be directed into any one of the hoppers by opening the desired valve, either valve 66, 70 or 68, regenerating gas passing through lines 62, 67 and 69.

The following example presents data illustrating the comparative rates of erosion and attrition when employing a powdered catalyst and a spherical catalyst.

*Example*

The rate of attrition is measured as the weight per cent loss of catalyst per hour per pound of catalyst circulated per hour. The extent of erosion was determined by circulating the catalyst with air through copper metal tubes and was measured as the weight per cent of metal loss per hour per pound of catalyst circulated per hour.

|  | Avg. Mesh Size | Air Rate SCFH | Cat. Load Lb. per CF | Attrition Wt. Per cent Cat. Loss per Hr. Lb. Cat. Cir. per Hr. ×10⁻⁴ | Erosion Wt. Per cent Metal Loss per Hr. Lb. Cat. Cir. per Hr. ×10⁻⁴ |
|---|---|---|---|---|---|
| Powdered Cat | 70 | 32.3 | 1.04 | 80 | 30 |
| Spherical Cat | 70 | 32.3 | 1.06 | 3.6 | 5 |

It will be noted from the above data that the rate of attrition of the powdered catalyst is approximately 22 times that of the spherical catalyst. It will also be noted that the erosion rate of the powdered catalyst was 6 times that of the spherical catalyst.

I claim as my invention:

1. A process for converting hydrocarbons which comprises passing a stream of hydrocarbons containing suspended spherical particles of catalyst through a reaction zone maintained at conversion conditions, separating catalyst from conversion products, fractionating said conversion products to separate a stream of normally gaseous products, suspending said separated catalyst in at least a portion of the stream of normally gaseous products, supplying the resultant suspension to a catalyst regenerating zone and therein separating catalyst from the gaseous products and retaining the separated catalyst, stopping the flow of said suspension into the regenerating zone after a predetermined time and regenerating the catalyst therein contained at relatively low pressure, thereafter supplying another portion of said stream of gaseous products under elevated pressure to said regenerating zone to provide sufficient pressure therein to force said catalyst into said stream of hydrocarbons prior to conversion of the latter, and then discharging the catalyst from the regenerating zone into the last-named stream under the pressure thus provided in the regenerating zone.

2. A process for cracking hydrocarbons which comprises passing a stream of hydrocarbon containing suspended spherical particles of catalyst through a cracking zone maintained at cracking conditions, separating catalyst from the cracked products, fractionating said cracked products to separate a stream of normally gaseous products, suspending said separated catalyst in at least a portion of the stream of normally gaseous products, supplying the resultant suspension to a catalyst regenerating zone and therein separating catalyst from the gaseous products and retaining the separated catalyst, stopping the flow of said suspension into the regenerating zone after a predetermined time and regenerating the catalyst therein contained at relatively low pressure, thereafter supplying another portion of said stream of gaseous products under elevated pressure to said regenerating zone to provide sufficient pressure therein to force said catalyst in said stream of hydrocarbon prior to cracking of the latter, and then discharging the catalyst from the regenerating zone into the last-named stream under the pressure thus provided in the regenerating zone.

3. A process for catalytically reforming hydrocarbons which comprises passing a stream of gasoline hydrocarbons containing suspended spherical particles of catalyst through a conversion zone maintained at reforming conditions, separating catalyst from catalytically reformed products, fractionating said catalytically reformed products to separate a stream of normally gaseous products, suspending said separated catalyst in at least a portion of the stream of normally gaseous products, supplying the resultant suspension to a catalyst regenerating zone and therein separating catalyst from the gaseous products and retaining the separated catalyst, stopping the flow of said suspension into the regenerating zone after a predetermined time and regenerating the catalyst therein contained at relatively low pressure, thereafter supplying another portion of said stream of gaseous products under elevated pressure to said regenerating zone to provide sufficient pressure therein to force said catalyst into said stream of hydrocarbon prior to the catalytic reforming of the latter, and then discharging the catalyst from the regenerating zone into the last-named stream under the pressure thus provided in the regenerating zone.

4. A process for the catalytic dehydrogenation of a dehydrogenatable hydrocarbon which comprises passing a stream of hydrocarbon containing suspended spherical particles of a dehydrogenation catalyst through a conversion zone maintained at dehydrogenation conditions, separating catalyst from dehydrogenated products, fractionating said dehydrogenated products to separate a stream of normally gaseous products, suspending said separated catalyst in at least a portion of the stream of normally gaseous products, supplying the resultant suspension to a catalyst regenerating zone and therein separating catalyst from the gaseous products and retaining the separated catalyst, stopping the flow of said suspension into the regenerating zone after a predetermined time and regenerating the catalyst therein contained at relatively low pressure, thereafter supplying another portion of said stream of gaseous products under elevated pressure to said regenerating zone to provide sufficient pressure therein to force said catalyst into said stream of hydrocarbon prior to catalytic dehydrogenation of the latter, and then discharging the catalyst from the regenerating zone into the last-named stream under the pressure thus provided in the regenerating zone.

5. The process of claim 2 further characterized in that said catalyst comprises a silica-alumina composite.

6. The process of claim 3 further characterized in that said catalyst comprises alumina-chromia.

7. The process of claim 4 further characterized in that said catalyst comprises alumina-chromia.

8. A hydrocarbon conversion process which comprises introducing to a reaction zone a stream of hydrocarbons containing suspended spherical catalyst particles and therein subjecting the hydrocarbons to conversion conditions in the presence of the catalyst, separating resultant conversion products from the catalyst particles and fractionating the same to separate normally gaseous hydrocarbon products from normally liquid hydrocarbons, suspending separated catalyst particles in a portion of said gaseous products, transferring said separated catalyst particles by means of the resultant suspension to a regenerating zone and retaining the transferred catalyst in said regenerating zone until a substantial body of catalyst particles has been accumulated therein, thereafter interrupting the transfer of said catalyst particles to said regenerating zone and regenerating said body of catalyst particles in situ at relatively low pressure, subsequently introducing a second portion of said gaseous products to said regenerating zone in sufficient amount to increase the pressure in this zone to above that prevailing in the reaction zone, and then discharging said body of regenerated catalyst particles under the increased pressure from said regenerating zone into said stream of hydrocarbons being supplied to the reaction zone.

9. A hydrocarbon conversion process which comprises introducing to a reaction zone a stream of hydrocarbons containing suspended spherical catalyst particles and therein subjecting the hydrocarbons to conversion conditions in the presence of the catalyst, separating resultant conversion products from the catalyst particles and fractionating the same to separate normally gaseous hydrocarbon products from normally liquid hydrocarbons, suspending separated catalyst particles in a portion of said gaseous products, transferring said separated catalyst particles by means of the resultant suspension to a regenerating zone and retaining the transferred catalyst in said regenerating zone until a substantial body of catalyst particles has been accumulated therein, thereafter interrupting the transfer of said catalyst particles to said regenerating zone and regenerating said body of catalyst particles in situ at relatively low pressure, subsequently introducing a second portion of said gaseous products to said regenerating zone in sufficient amount to increase the pressure in this zone to above that prevailing in the reaction zone, thereafter discharging said body of regenerated catalyst particles under the increased pressure from said regenerating zone into a third portion of said gaseous products to form a suspension therein, and commingling said last named suspension with said stream of hydrocarbons being supplied to said reaction zone.

10. A hydrocarbon conversion process which comprises introducing to a reaction zone a stream of hydrocarbons containing suspended spherical catalyst particles and therein subjecting the hydrocarbons to conversion conditions in the presence of the catalyst, separating the resultant conversion products from contaminated catalyst particles, fractionating said conversion products to separate a hydrocarbon gas from liquid hydrocarbons, suspending said contaminated catalyst particles in a portion of said hydrocarbon gas, introducing said contaminated catalyst particles by means of the resultant suspension to one of a plurality of catalyst storage zones and retaining the transferred catalyst therein until a substantial body of contaminated catalyst particles has accumulated therein, thereafter diverting the introduction of said contaminated catalyst particles to another of said storage zones, introducing an oxygen-containing regenerating gas into the storage zone containing said body of contaminated catalyst particles and regenerating the latter in situ, thereafter diverting the introduction of said regenerating gas to another of said storage zones, introducing a second portion of said hydrocarbon gas to the storage zone containing the body of regenerated catalyst particles to increase the pressure therein, discharging said body of regenerated catalyst particles under the increased pressure from said last-named storage zone into said stream of hydrocarbons being supplied to said reaction zone, and successively repeating in each of said storage zones the steps of transferring, regenerating, repressuring, and discharging catalyst whereby to provide a continuous process of hydrocarbon conversion and catalyst regeneration.

11. The process of claim 10 further characterized in that said body of regenerated catalyst particles is discharged into a third portion of said hydrocarbon gas to form a suspension therein, and the last-named suspension is commingled with said stream of hydrocarbons being supplied to said reaction zone.

DAVIS READ, Jr.

REFERENCES CITED

The following references are of record in the file of this patent:

UNITED STATES PATENTS

| Number | Name | Date |
|---|---|---|
| 2,305,569 | Degnen | Dec. 15, 1942 |
| 2,338,606 | Voorhees | Jan. 4, 1944 |
| 2,379,711 | Hemminger | July 3, 1945 |
| 2,384,943 | Marisic | Sept. 18, 1945 |
| 2,384,356 | Tyson | Sept. 4, 1945 |